US010706499B2

(12) United States Patent
Uchiyama

(10) Patent No.: US 10,706,499 B2
(45) Date of Patent: Jul. 7, 2020

(54) IMAGE PROCESSING USING AN ARTIFICIAL NEURAL NETWORK

(71) Applicant: CANON KABUSHIKI KAISHA, Tokyo (JP)

(72) Inventor: Hiroyuki Uchiyama, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 16/014,874

(22) Filed: Jun. 21, 2018

(65) Prior Publication Data

US 2019/0392550 A1 Dec. 26, 2019

(51) Int. Cl.
*G06T 1/60* (2006.01)
*G06T 7/194* (2017.01)
*G06T 7/70* (2017.01)

(52) U.S. Cl.
CPC .............. *G06T 1/60* (2013.01); *G06T 7/194* (2017.01); *G06T 7/70* (2017.01); *G06T 2207/10024* (2013.01); *G06T 2207/20081* (2013.01); *G06T 2207/20084* (2013.01)

(58) Field of Classification Search
CPC .. G06T 1/60; G06T 7/194; G06T 7/70; G06K 9/6232; G06K 9/6255; G06K 9/6261; G06K 9/52; G06N 3/084; G06N 3/08; G06N 3/02; G06N 3/04; G06F 17/16
See application file for complete search history.

(56) References Cited

U.S. PATENT DOCUMENTS

| 10,332,001 B2* | 6/2019 | Rippel | G06K 9/6232 |
| 2019/0057509 A1* | 2/2019 | Lv | G06T 7/254 |
| 2019/0147372 A1* | 5/2019 | Luo | G06N 20/00 |
| 2019/0279005 A1* | 9/2019 | Ogale | G06N 3/0454 |
| 2019/0311415 A1* | 10/2019 | Sewak | G06N 20/00 |

OTHER PUBLICATIONS

Di Kang; Debarun Dhar; Antoni B. Chan. Crowd Counting by Adapting Convolutional Neural Networks with Side Information. CoRR 2016, abs/1611.06748.
E. Shelhamer, J. Long and T. Darrell, "Fully Convolutional Networks for Semantic Segmentation," in IEEE Transactions on Pattern Analysis and Machine Intelligence, vol. 39, No. 4, pp. 640-651, Apr. 1, 2017.
N. Dalal and B. Triggs, "Histograms of oriented gradients for human detection," 2005 IEEE Computer Society Conference on Computer Vision and Pattern Recognition (CVPR'05).
Viola, Jones: Robust Real-time Object Detection, IJCV 2001; pp. 1-25.

* cited by examiner

*Primary Examiner* — David F Dunphy
(74) *Attorney, Agent, or Firm* — Canon U.S.A., Inc. IP Division

(57) ABSTRACT

The present disclosure provides a system of analysing an object in an image. The system comprises a processor and a memory in communication with the processor. The memory has application programs that are executable by the processor, wherein the processor executes the application programs to perform a method of analysing the object in the image. The method comprises the steps of determining an image tensor of the image; determining context information of the image; determining a context tensor of the determined context information; combining the image tensor and the context tensor to form a combined tensor; and estimating an attribute of the object based on the combined tensor.

18 Claims, 13 Drawing Sheets

IMAGE PROCESSING USING AN ARTIFICIAL NEURAL NETWORK

TECHNICAL FIELD

The present description relates generally to image processing and, in particular, to determining an attribute of an object in an image based on context information of the image by using an artificial neural network.

BACKGROUND

Public venues such as shopping centres, parking lots and train stations are increasingly subject to surveillance using large-scale networks of video cameras. Application domains of large-scale video surveillance include security, safety, traffic management and business analytics.

A key task in many of these applications is rapid and robust object matching across multiple camera views. In one example called "hand-off", object matching is applied to persistently tracked multiple objects across a first and second camera with overlapping fields of view. In another example called "re-identification", object matching is applied to locate a specific object of interest across multiple cameras in the network with non-overlapping fields of view. In the following discussion, the term "object matching" will be understood to include the terms "hand-off", "re-identification", "object identification", and "object recognition".

A camera captures an image at a time. An image is made up of visual elements. The terms "pixel", "pixel location" and "image location" are used interchangeably throughout this specification to refer to one of the visual elements in a captured image. Each pixel of an image is described by one or more values characterising a property of the scene captured in that particular pixel. In one example, a single intensity value characterises the brightness of the scene at the pixel location. In another example, a triplet of values characterise the colour of the scene at the pixel location. Furthermore, a "region", "image region" or "cell" in an image refers to a collection of one or more spatially adjacent visual elements.

A "bounding box" refers to a rectilinear image region enclosing an object in an image. In the present disclosure, the bounding box encompasses the object of interest, which is usually a pedestrian in the application of video surveillance.

A common approach for object matching includes the steps of extracting an "appearance signature" for each object and using the appearance signature to compute a similarity between different objects. Throughout this description, the term "appearance signature" refers to a set of values summarizing the appearance of an object or region of an image, and will be understood to include the terms "appearance model", "feature descriptor" and "feature vector".

One of the steps of obtaining the appearance signature is segmenting one region of the captured image that belongs to the object itself (also known as the foreground), and another region of the captured image that belongs to the scene (also known as the background). This process is commonly known as "foreground segmentation", or "foreground background classification".

One commonly used tool to perform such an analysis is using an artificial neural network (ANN). An artificial neural network includes a set of nodes, a set of weights, and a set of edges, also referred to as connections. Each of the edges is weighted and connects two nodes of the ANN. The weighted edges are also referred to as weighted connections.

The artificial neural network is trained using a set of training input and output instances. For example, the training input could be the RGB pixels of an image, and the output could be the likelihood for each pixel to be part of the foreground. Hereinafter, such an output is called "foreground mask."

One type of artificial neural network is called Convolutional Neural Networks (CNN). CNN arranges the ANN nodes along with the weights into layers. Operators such as "convolution", "max pooling", "Rectified Linear Unit (ReLU)" and "softmax" are performed by one or more layers (also called sub-networks) of the CNN. Each of the layers and sub-networks calculates the node input values of the next layer and sub-network, respectively, of the CNN.

In an example where each layer performs an operation, the first layer is the input to the CNN that could be, for example, the image data. Through each operator (i.e., layer in this example), the CNN calculates the node input values of the next layer. The last layer is the output layer, which could be the likelihood of each pixel to be part of the foreground of the image data (which is the input to the first layer). The CNN for foreground segmentation commonly uses "deconvolution" operator as well as the operators above. The CNN may be trained using one dataset prior to using another dataset. This process is commonly known as "pre-training". The pre-training provides better initial weights for the following training and ultimately the foreground segmentation of an image.

The following describes some of the operations that the CNN can perform.

Convolution is a commonly known filter operation, which is illustrated in FIG. 10. FIG. 10 shows a "conv3×3" operation, which means a 3×3 linear filter 1010 that is being applied to a given two-dimensional layer 1020. The application of the 3×3 linear filter 1010 to the two-dimensional layer 1020 results in the forming of a new two-dimensional layer 1030.

For example, let I(x,y) be an two-dimensional layer 1020 with coordinates (x,y), and let f(u,v) (u=−1,0,1, v=−1,0,1) be a "3×3 kernel" 1010. The values of f(u,v) is also known as the "weights" of the kernel. The output of applying conv3×3 to the layer 1020, denoted by (I*f) is:

$$(I*f)(x,y) = \Sigma_{u=-1}^{1} \Sigma_{v=-1}^{1} I(x-u, y-v) f(u,v) \qquad \text{Eq. 1}$$

It is possible to have a convolution kernel of different sizes, other than 3×3. Further, it is possible to have convolution applied to a three-dimensional layer:

$$(I*f)(x,y,z) = \Sigma_{u=-1}^{1} \Sigma_{v=-1}^{1} \Sigma_{w=1}^{c} I(x-u, y-v, w) f(u,v,w,z) \qquad \text{Eq. 2}$$

where the input three-dimensional layer has size W×H×C.

Deconvolution, denoted by deconv, is a commonly known filter operation. One example of the deconvolution operation is illustrated in FIG. 11. Given an input of a two-dimensional layer 1110, zero paddings are inserted to between elements of the two-dimensional layer 1120. The value of each element 1111 is simply copied across to a new position 1121 with zeros valued elements in between. A convolution (see FIG. 10) is then applied to the padded layer, to form the deconvolved layer 1130. Different size kernel and different number of padding elements could be applied. In particular one could obtain a deconvolved layer 1130 that is exactly twice the size as the input layer 1110, by padding an extra row and column of zero elements in the two-dimensional layer 1120.

Maxpooling is a filter to shrink a two-dimensional layer. Assuming a filter of 2×2, the maxpooling operation would divide the two-dimensional layer into many adjacent 2×2 non-overlapping regions. The max element in each region forms the element to the resultant two-dimensional layer. The resultant layer would have half of the dimension as the input layer.

Fully connected layer, commonly denoted by fc, is a filter to apply linear operation. Let x(i), y(j) (i=1,2,3, . . . ,I, j=1,2,3, . . . ,J) be input and output vector, respectively. Let w(j,i), b(j) be weights and bias, respectively. The output y(j) is:

$$y(j)=\Sigma_i w(i,j)x(i)+b(j) \quad \text{Eq. 3}$$

Even armed with tools like the CNN, foreground segmentation is still a challenging problem. One challenge is adapting the CNN to different context information, as a CNN trained for foreground segmentation with one environment may not function well for a different environment. Context information (also referred to as context in the present disclosure) refers to additional information that is related to an image, but is not part of the visual elements or metadata of that image. The term context or context information will be discussed in detail below.

One conventional method for crowd counting uses an adaptive convolutional neural network (ACNN) to adapt to multiple context. The ACNN has convolution layers (or sub-networks) that can change weights of convolution according to the context information. However, it is difficult for these convolution layers to be pre-trained without context information because the weight is controlled by the context information.

Computational cost is another challenge. The CNN suffers from large computation cost to process a large number of images. The problem becomes more challenging if the CNN needs to be embedded in a portable product, e.g. a camera, which has less processing resources than a desktop computer.

SUMMARY

The present description provides a method and system for foreground segmentation using a CNN using context information of an image.

It is an object of the present invention to substantially overcome, or at least ameliorate, one or more disadvantages of existing arrangements.

An aspect of the present disclosure provides a method of analysing an object in an image, the method comprising the steps of: determining an image tensor of the image; determining context information of the image; determining a context tensor of the determined context information; combining the image tensor and the context tensor to form a combined tensor; and estimating an attribute of the object based on the combined tensor.

Another aspect of the present disclosure provides a system of analysing an object in an image, the system comprising; a processor; a memory in communication with the processor, the memory having application programs that are executable by the processor, wherein the processor executes the application programs to perform a method of analysing the object in the image, the method comprising the steps of: determining an image tensor of the image; determining context information of the image; determining a context tensor of the determined context information; combining the image tensor and the context tensor to form a combined tensor; and estimating an attribute of the object based on the combined tensor

BRIEF DESCRIPTION OF THE DRAWINGS

One or more embodiments of the invention will now be described with reference to the following drawings, in which.

DETAILED DESCRIPTION INCLUDING BEST MODE

Figure 1:
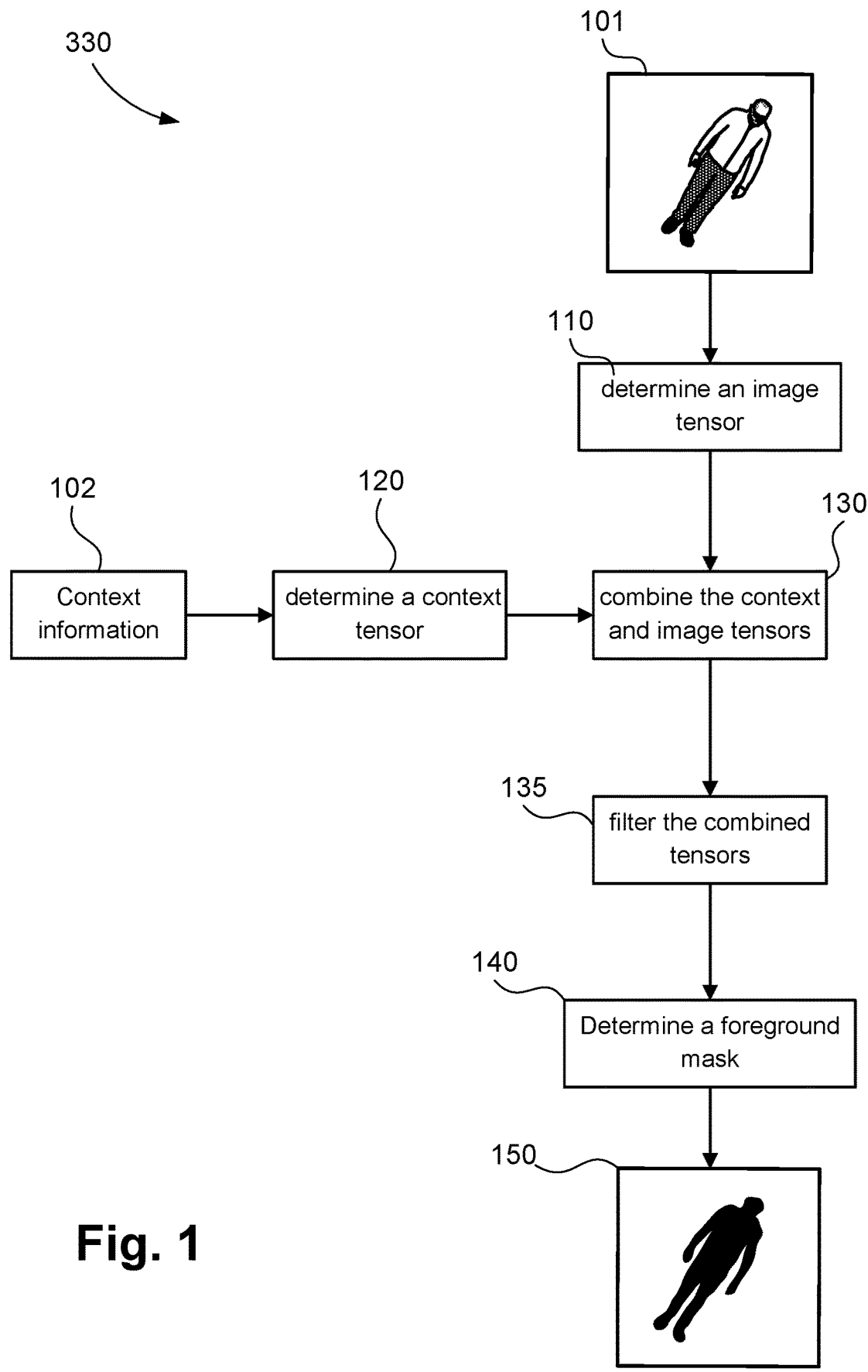
FIG. 1 is a flow chart diagram of a sub-process of estimating an object attribute of the method shown in FIG. 3.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

Figure 3:
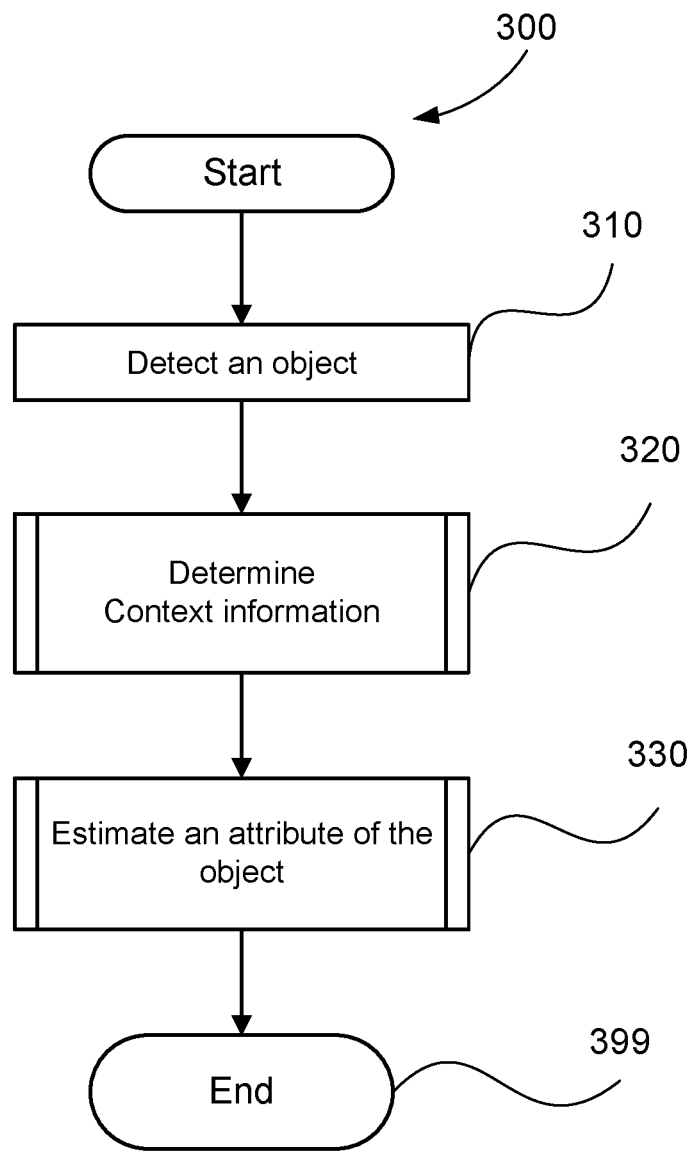
FIG. 3 is a flow chart diagram illustrating an object attribute estimation method in accordance with an aspect of the present disclosure.

FIG. 3 illustrates a method 300 of performing an object attribute estimation method that uses a CNN to perform such an estimation. The method 300 receives an image as input and outputs an estimated attribute (e.g, the foreground mask, a characteristic) of an object in the received image. The method 300 could be implemented by a general-purpose computer system depicted in FIG. 8A and FIG. 8B.

Computer Structure

Figure 8A:
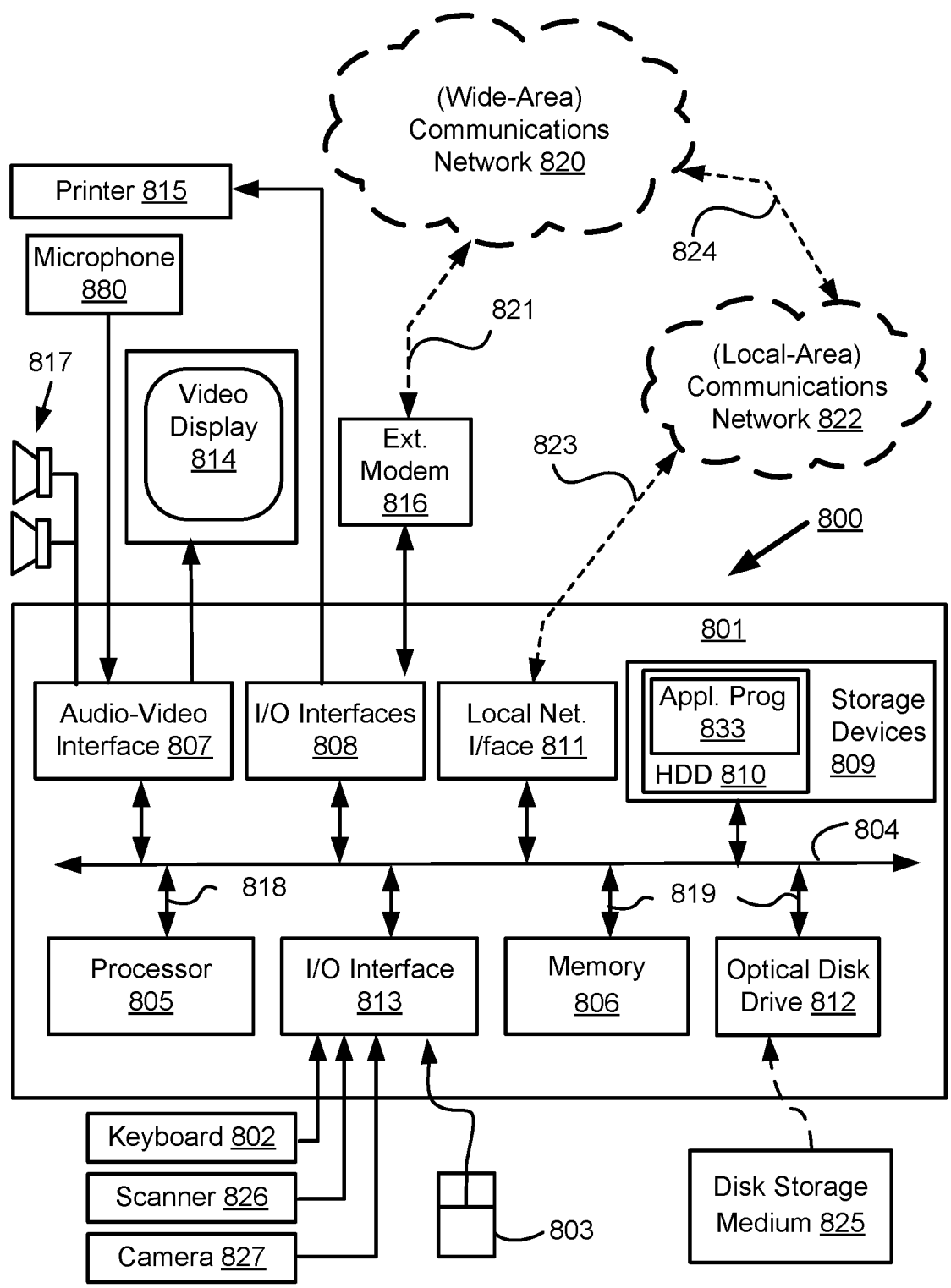
FIGS. 8A and 8B form a schematic block diagram of a general purpose computer system upon which the method shown in FIG. 3 can be practiced.
Figure 8B:
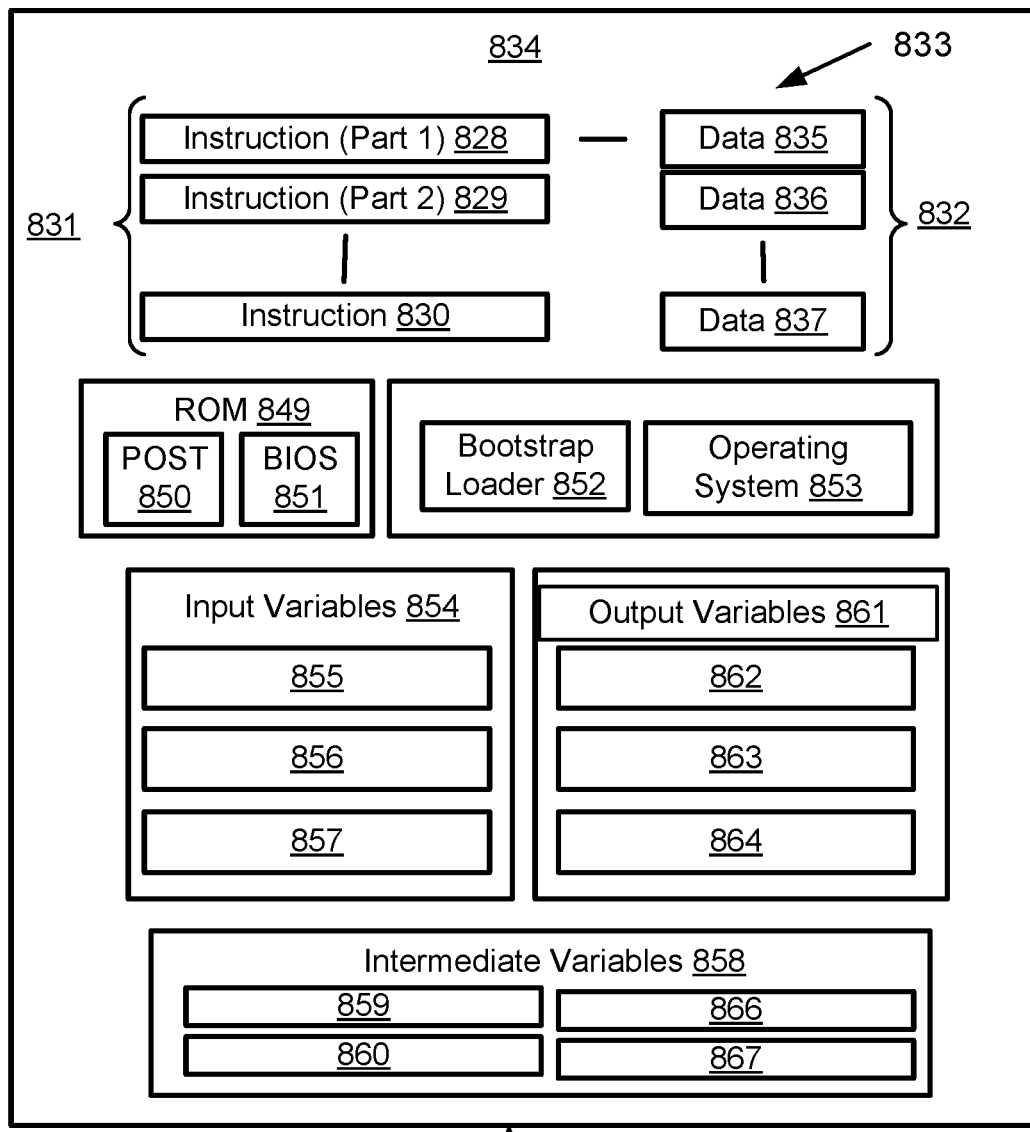
Figure 8B:
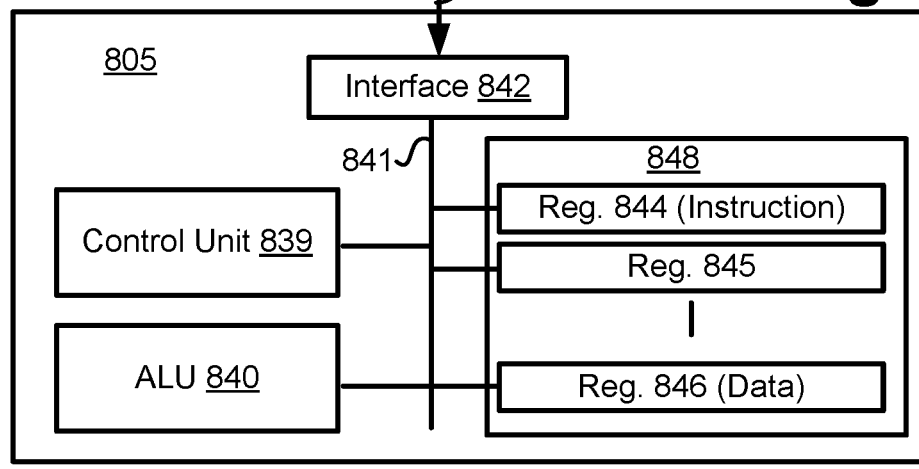

FIGS. 8A and 8B depict a general-purpose computer system 800, upon which the various arrangements described can be practiced.

As seen in FIG. 8A, the computer system 800 includes: a computer module 801; input devices such as a keyboard 802, a mouse pointer device 803, a scanner 826, a camera 827, and a microphone 880; and output devices including a printer 815, a display device 814 and loudspeakers 817. An external Modulator-Demodulator (Modem) transceiver device 816 may be used by the computer module 801 for communicating to and from a communications network 820 via a connection 821. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

The computer module 801 typically includes at least one processor unit 805, and a memory unit 806. For example, the memory unit 806 may have semiconductor random access memory (RAM) and semiconductor read only memory (ROM). The computer module 801 also includes an number of input/output (I/O) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 801, for example within the interface 808. The computer module 801 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet circuit card, a Bluetooth® wireless arrangement or an IEEE 802.11 wireless arrangement; however, numerous other types of interfaces may be practiced for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 800.

The components 805 to 813 of the computer module 801 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practised include IBM-PC's and compatibles, Sun Sparcstations, Apple Mac™ or like computer systems.

The method 300 and other methods described below may be implemented using the computer system 800 wherein the processes of FIGS. 3, 1, 2, 5, 7, and 9 to be described, may be implemented as one or more software application programs 833 executable within the computer system 800. In particular, the steps of the method 300 are effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 833 is typically stored in the HDD 810 or the memory 806. The software is loaded into the computer system 800 from the computer readable medium, and then executed by the computer system 800. Thus, for example, the software 833 may be stored on an optically readable disk storage medium (e.g., CD-ROM) 825 that is read by the optical disk drive 812. A computer readable medium having such software or computer program recorded on the computer readable medium is a computer program product. The use of the computer program product in the computer system 800 preferably effects an advantageous apparatus for implementing the described methods.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media. Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 801. Examples of transitory or non-tangible computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the HDD 809 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 801 to ensure proper functioning and typically checks the processor 805, the memory 834 (809, 806), and a basic input-output systems software (BIOS) module 851, also typically stored in the ROM 849, for correct operation. Once the POST program 850 has run successfully, the BIOS 851 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfil various high level functions, including processor management, memory management, device management, storage management, software application interface, and generic user interface.

The operating system 853 manages the memory 834 (809, 806) to ensure that each process or application running on the computer module 801 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

As shown in FIG. 8B, the processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 805 waits for a subsequent input, to which the processor 805 reacts to by executing another set of instructions. Each input may be provided from one or more of a number of sources, including data generated by one or more of the input devices 802, 803, data received from an external source across one of the networks 820, 802, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The disclosed arrangements use input variables 854, which are stored in the memory 834 in corresponding memory locations 855, 856, 857. The disclosed arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

a fetch operation, which fetches or reads an instruction 831 from a memory location 828, 829, 830;

a decode operation in which the control unit 839 determines which instruction has been fetched; and an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 3, 1, 2, 5, 7, and 9 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The Object Attribute Estimation Method

FIG. 3 shows a method 300 of determining object attribute estimation using a CNN. The method 300 receives an image as input and outputs the estimated object attribute (e.g., the foreground mask, a characteristic) of the received image. The method 300 is implemented as software application programs 833 that are executable by the computer system 800.

The method 300 receives an image as input and commences at step 310. In step 310, the method 300 detects an object on the received image. The object may be a person, an animal, a vehicle, and the like.

If the object is a person, a suitable person detection method can be used to detect the person. One example of a person detection method is a supervised machine learning method. This person detection method classifies an image region as containing a person based on a set of exemplar images of people. The output of the person detection method is a bounding box, which encompasses the person in the received image. In this exemplar use case, the image region that is encompassed by the bounding box is called "person image".

Hereinafter, the example of detecting a person will be used to describe the method 300. However, as will be appreciated by a skilled person, the method 300 can be used to detect any specific objects (e.g., an animal, a vehicle, and the like) in the received image.

Once the object in the received image is detected, the method 300 proceeds from step 310 to sub-process 320.

In sub-process 320, the context relating to the received image is determined by the method 300. Context refers to additional information that is related to the image, but is not part of the visual elements of that image. Context could be weather information such as binary flags on whether the image was captured at a sunny, cloudy, rainy, or snowing day. Context could be camera settings such as focus, colour balancing of the camera, and image compression rate. Context could be the time of day when the image is captured. Context could be environment information such as outdoor and indoor. Context could be the location and orientation of the camera such as camera height relative to floor coordinates, the yaw angle, the pitch angle, and the roll angle.

Although the image itself may show the context, the context is not explicitly part of the visual elements or metadata of the image. For example, an image showing snow includes visual elements of the colour of snow, but the visual elements of that image do not indicate the presence of snow. Therefore, the context information must be related to the image.

Context information could be represented as a scalar, a vector, a tensor, and the combination thereof. Context information could represent a distribution, an intensity value, an index, a degree, a binary flag, and other types of measurements. The context information used as an example to describe the method 300 in the present disclosure is the deviated angle of the person detected in the image due to the vanishing point of the camera.

Figure 4:
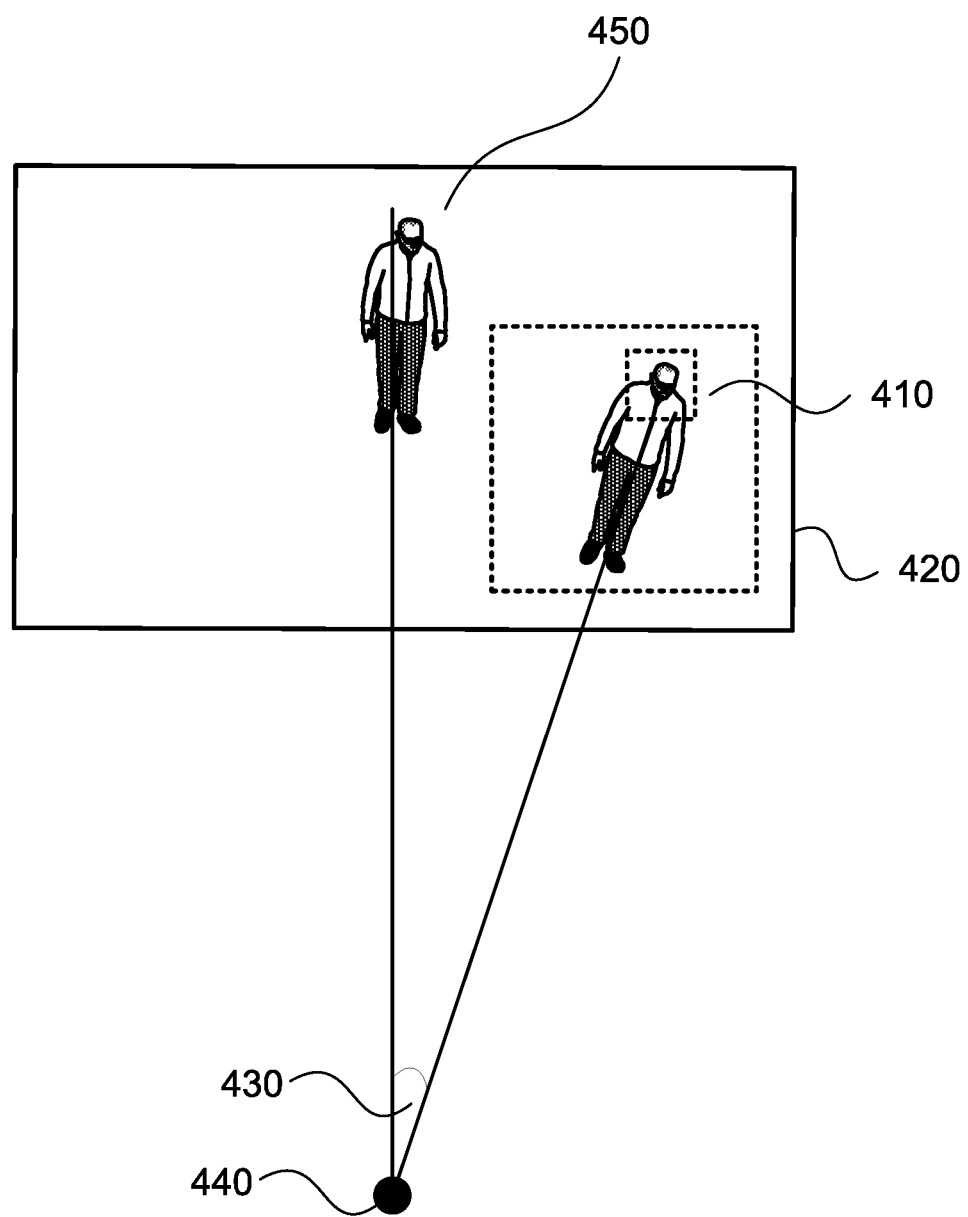
FIG. 4 is an example illustration of context of an image that is being processed by the method of FIG. 3.

FIG. 4 illustrates an example of the deviated angle of the person due to the vanishing point of the camera. A person 410, who is standing straight in the scene, is captured in an image 420. The reason the person 410 in the image appears to be tilted, even though the person 410 is standing straight, is because in projective geometry an upward direction in an image 420 depends on the vanishing point 440 of the image 420. The same person would not appear to be tilted if that person is in position 450, which is directly above the vanishing point 440. The tilted angle 430 is called the deviated angle.

Figure 5:
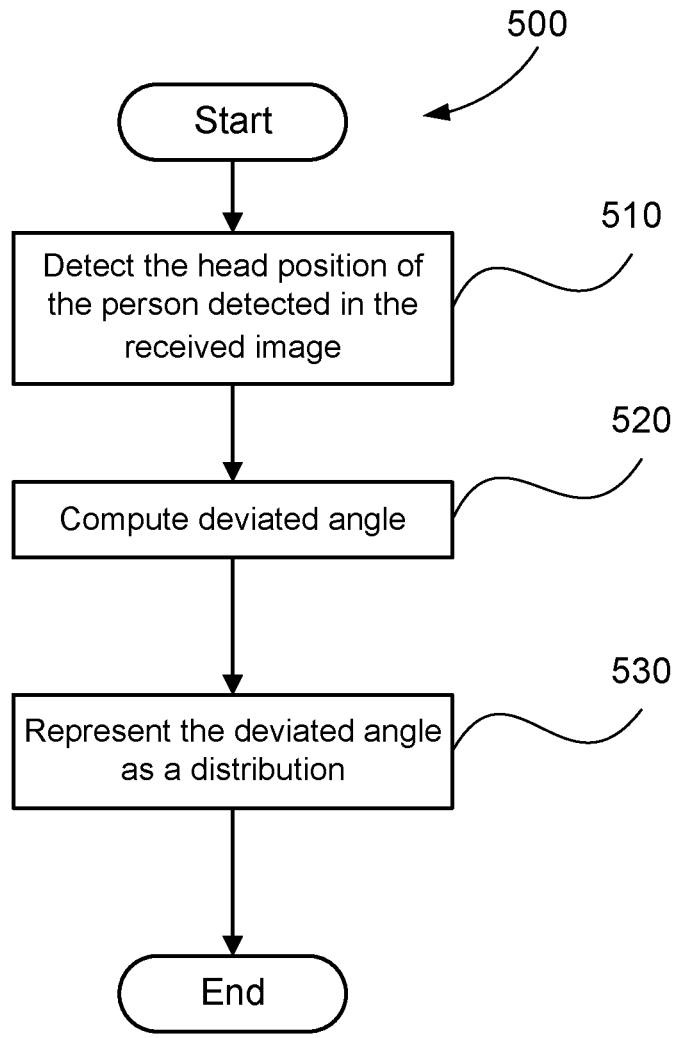
FIG. 5 is a flow chart diagram of determining the context information of the example illustration shown in FIG. 4.

FIG. 5 depicts a method 500 of determining the deviated angle of the person 410 detected in the received image 420 (which is performed in sub-process 320). The method 500 is implemented as software application programs 833 that are executable by the computer system 800.

The method 500 commences at step 510 by detecting the head position of the detected person 410 in the received image 420. Examples of head detections methods are Viola-Jones Object Detector, R-CNN (Region proposals with CNNs), and the like. One head detection method uses a supervised machine learning method. This head detection method classifies an image region as containing a head based on a set of exemplar images of heads. The output of the head detection method is an estimation of the centre of the head in (x,y) coordinates in the received image 420. The method 500 then proceeds from step 510 to step 520 when the coordinates of the head of the detected person 410 is determined.

In step 520, the method 500 computes the deviated angle of the person 410 detected in the received image 420. One example of computing the deviated angle of the person 410 is as follows:

Let (hx, hy) denote the coordinates of the head determined in step 510. Let (vx, vy) denotes the coordinates of the vanishing point 440 of the image 420. The (vx, vy) coordinates could be determined as part of the camera's specification, or could be determined by other means (such as during a camera calibration process). The deviated angle 430 can then be computed using the following equation:

$$\arctan\left(\frac{vx - hx}{vy - hy}\right) \quad \text{Eq. 4}$$

with the assumption of the image convention that coordinates (0, 0) is located at the top left corner of the image 420. For ease of explanation, it will be assumed that the deviated angle 430 in this example is −15.5 degree.

The method 500 proceeds from step 520 to step 530, once the deviated angle is computed.

In step 530, the method 500 represents the deviated angle 430 as a distribution. A distribution is a histogram of N bins, where N for example is 8. N could be other real numbers such as 16, 20, and the like. In this example, the bin values could be associated with groupings of: (1) "less than −20 degree", (2) "−20 to −10 degree", (3) "−10 to −5 degree", (4) "−5 to 0 degree", (5) "0 to 5 degree", (6) "5 to 10 degree", (7) "10 to 20 degree", and (8) "more than 20 degree".

The exemplar deviated angle 430 of −15.5 degree would lay in the second bin of "−20 to −10 degree", hence the histogram of the 8 bins is [0,1,0,0,0,0,0,0].

In one alternative example, the deviated angle 430 could be distributed based on the likelihood that the deviated angle 430 belongs to a particular group. For example, the face detection algorithm may return the likelihood of multiple head coordinates, or the vanishing point has a range, then the distribution of the deviated angle 430 would be a weighted histogram, e.g. [0.1, 0.7, 0.2, 0, 0, 0, 0]. Furthermore, the distribution could be identical (e.g. [0.125, 0.125, 0.125, 0.125, 0.125, 0.125, 0.125, 0.125]) if the deviated angle cannot be reliably determined.

The method 500 concludes at the conclusion of step 530.

Referring back to sub-process 320 in FIG. 3, after determining the context information using the above-described method 500, which in this example is a distribution of 8 values, the method 300 proceeds from sub-process 320 to step 330.

In sub-process 330, the method 300 estimates an attribute of the object in the received image. The attribute could be a mask (e.g., a foreground mask) relating to the object, and a characteristic (e.g., the position of a part of the object, the colour of the object, and the like). Examples of sub-process 330 are shown in FIG. 1 and FIG. 2.

Figure 2:
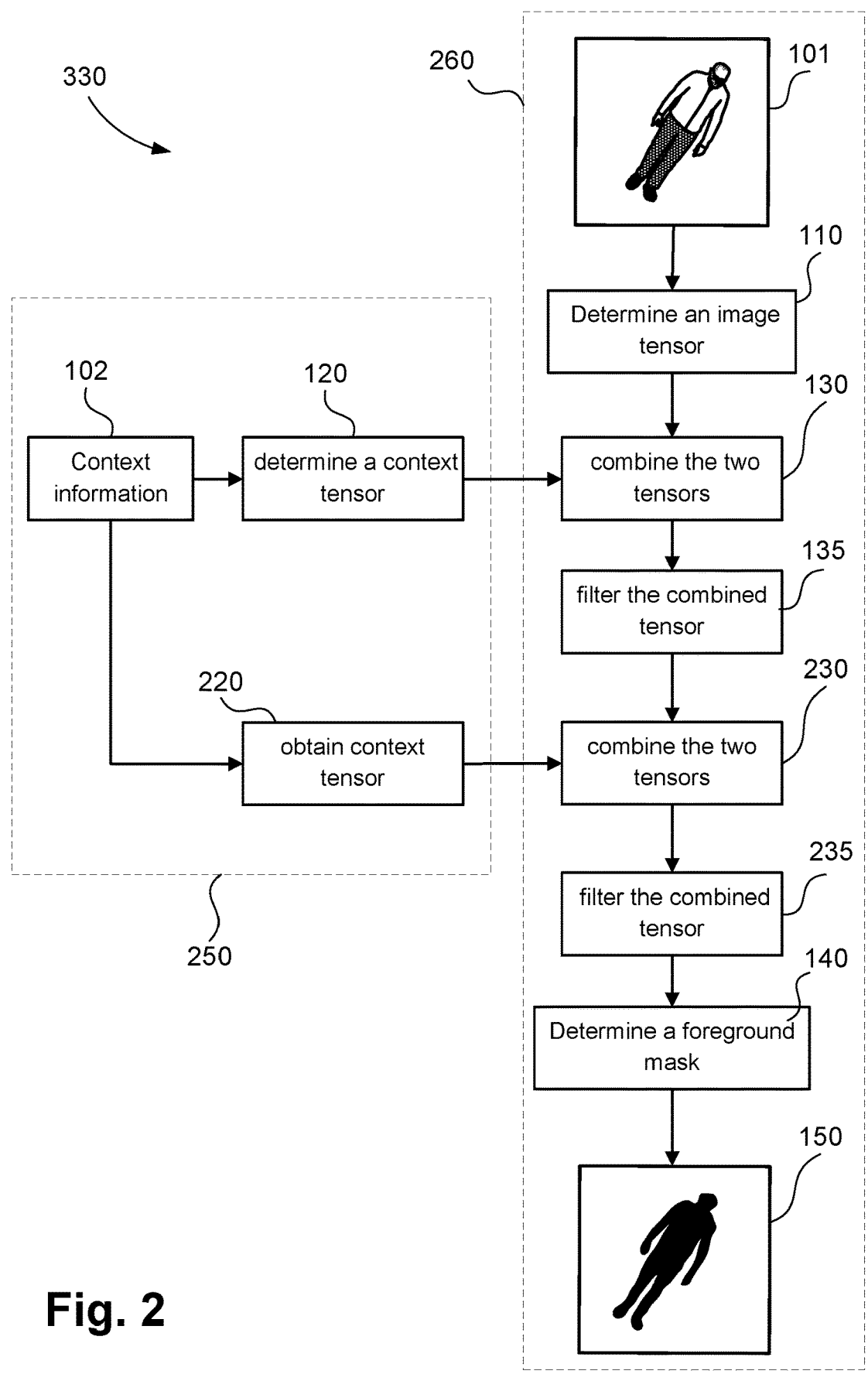
FIG. 2 is a flow chart diagram of an alternative sub-process of estimating an object attribute of the method shown in FIG. 3.

FIG. 1 shows one example of the sub-process 330 of estimating the mask (i.e., the foreground mask) of the object of the received image. The sub-process 330 receives two inputs, namely the person image 101 and the context information 102. The person image 101 is obtained in step 310 of the method 300. The person image is a W×H rectilinear image region. The context information is determine in sub-process 320 of the method 300, which in this example is performed by the method 500 of FIG. 5 to produce a vector of 8 numbers.

Each step (i.e., step 110, 120, 130, 135, 140) performed by sub-process 330 is implemented by a sub-network of a CNN, where a sub-network includes one or more layers of the CNN. Therefore, each of steps 110, 120, 130, 135, and 140 can also be referred to respectively as a sub-network 110, 120, 130, 135, and 140. In the present disclosure, the reference numerals 110, 120, 130, 135, and 140 can refer to either the step taken or the sub-network used to perform that particular step.

The sub-process 330 as depicted in FIG. 1 commences at step 110 where the person image 101 is received and at step 120 where the context information 102 (derived at step 320) is received. In one arrangement, steps 110 and 120 occur in parallel. In step 110, a tensor of the person image 101 is formed. This tensor is known as the "image tensor", which is independent of the context. Tensor is a mathematical term that refers to a high dimensional indexing of a vector, which commonly is a vector of 3 elements for RGB images.

The image 101 has the size of W pixels×H pixels. Each pixel contains 3 values that represent the respective RGB values for that pixel. Therefore, the image 101 can be represented by a first tensor with the size of W×H×C, where C=3 to represent the RGB values.

The following provides an example of a series of operations performed on the first tensor to determine the image sensor. There are other series of operations that could be used to determine the image tensor.

In this example, the first tensor is convolved using a convolution 3×3 operation (see equation 2) to determine a second tensor of the size W×H×C1. The value of C1 represents the number of times that the convolution 3×3 operation is applied to the first tensor, where each time a different weight (i.e., f(u, v, w, z) shown in equation 2) is applied. From experiments, it is found that C1=128 provides the optimal number of times to convolve the first tensor.

The second tensor is then convolved using a convolution 3×3 operation (see equation 2) to determine a third tensor of the size W×H×C2. Similar to C1, the value of C2 represents the number of times that the convolution 3×3 operation is applied to the second tensor. From experiments, it is found that C2=128 provides the optimal number of times to convolve the second tensor.

A max pooling operation is then performed on the third tensor to reduce the size of the second tensor. In this example, the third tensor has the size of W1×H1×C2, where W1 is less than W and H1 is less than H.

Further operations are then applied to each successive tensor as follows: conv3×3, max pooling, and conv3×3. Therefore, starting from the first tensor, the following operations are performed {conv3×3, conv3×3, max pooling, conv3×3, max pooling, conv3×3, max pooling, conv3×3} to determine an image tensor of the size Wi×Hi×Ci, where Wi is ⅛ of W, Hi is ⅛ of H, and Ci is 128.

Other series of operations could be used to determine an image tensor from the first tensor.

Once the image tensor is determined in step 110, the sub-process 330 proceeds to step 130.

Figure 12:
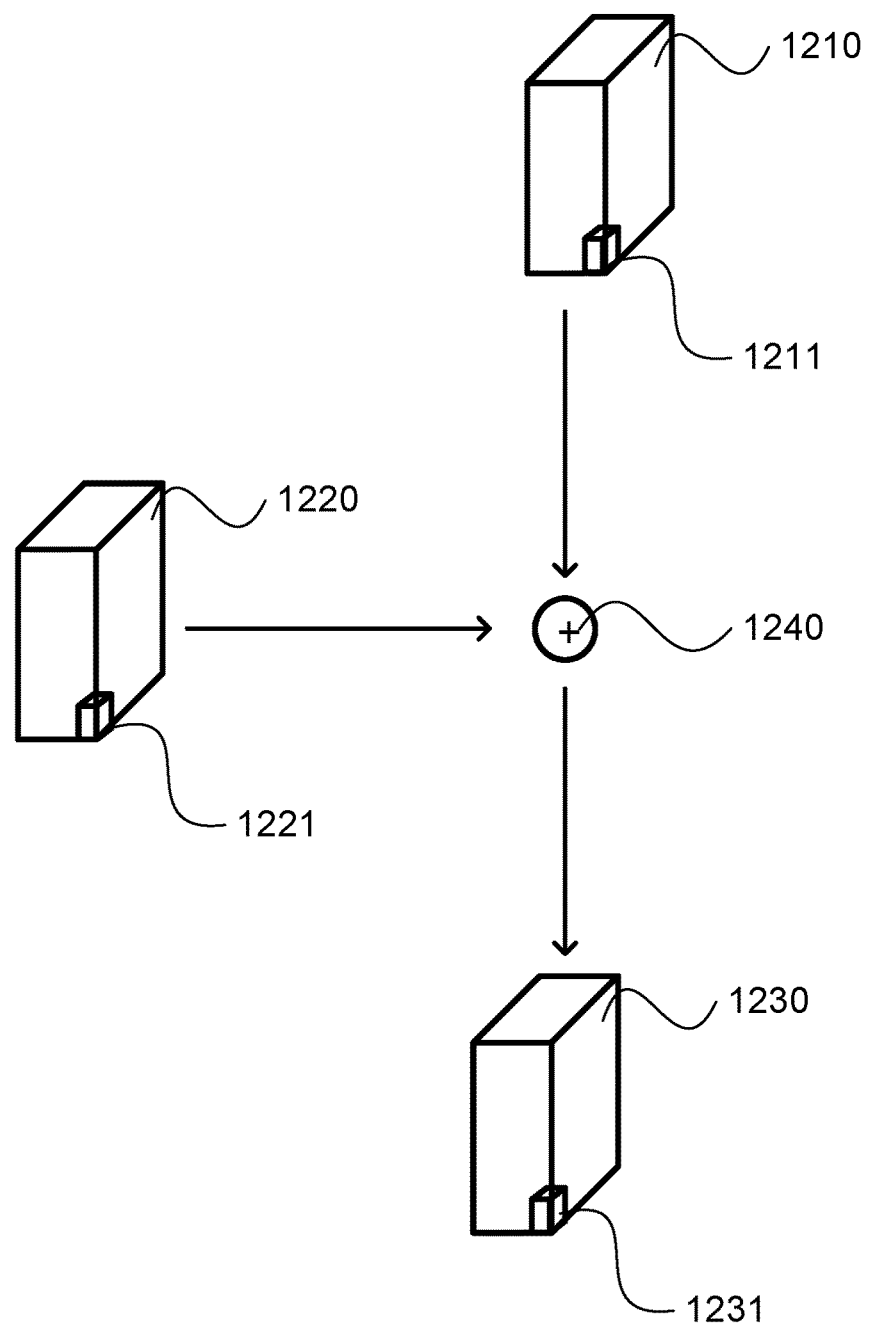
FIG. 12 illustrates the summation method of combining two tensors used in the sub-process shown in FIGS. 1 and 2.

As described hereinbefore, step 120 can occur concurrently with step 110. Alternatively, step 120 can occur before or after step 110. Step 120 forms a context tensor from the context information 102 (which is represented by a vector of 8 distribution values). The context tensor should have the same size of the image tensor to enable ease of combination of the context tensor and the image tensor (as shown in the arrangement of FIG. 12). However, in another arrangement (see the arrangement shown in FIG. 6), the context tensor does not have to have the same size as the image tensor, as described in relation to FIG. 6. Therefore, in the arrangement shown in FIG. 12, the context tensor should have the size of Wi×Hi×Ci.

One arrangement for producing the context tensor of the size Wi×Hi×Ci is to use one or more fully connected layers (see equation 3 above) to convert the vector of 8 distribution values (i.e., the context information 102 determined in the method 500 above) to a vector of 128 (i.e, the value of Ci). The vector of 128 is then duplicated across the Wi×Hi dimensions to form a context tensor of the size Wi×Hi×Ci.

An alternative arrangement is to produce a first tensor of the size T, where T is the product of Wi×Hi×Ct. Ct can be the same value as Ci. Alternatively, Ct can be any value. One or more fully connected layers (see equation 3 above) can then be used to convert the vector of 8 distribution values (i.e., the context information 102 determined in the method 500 above) to the first tensor of T size. The first tensor of size T×1×1 is then rearranged (and padded if required) to be a context tensor of the size Wi×Hi×Ci.

There are other arrangements that could be used to convert the context information 102 to a context tensor.

Once the context tensor is determined in step 120, the sub-process 330 proceeds to step 130.

In step 130, the sub-process 330 combines the image tensor (determined at step 110) and the context tensor (determined at step 120) and outputs a combined tensor of Cc×Wi×Hi. The value of Cc depends on the method of combining the image tensor and the context tensor, as exemplified below.

In one arrangement, the image tensor and the context tensor are combined by element-wise summation as illustrated in FIG. 12. The image tensor 120 has elements 1211, where the elements 1211 occupies the dimensions of the image tensor of Wi×Hi×Ci. FIG. 12 shows only one of the elements 1211 for simplicity sake. Similarly, the context tensor 1220 has elements 1221, where the elements 1211 occupies the dimensions of the context tensor of Wi×Hi×Ci. FIG. 12 shows only one of the elements 1221 for simplicity sake.

Each element 1211 in the image tensor 1210 is added 1240 to the corresponding element 1221 in the context tensor 1220. The combined tensor 1230 is formed by elements 1231, which is a summation of the corresponding elements 1211 and 1221. If any of the elements 1211 and 1221 is a complex number, summation refers to the usual complex number summation. If any of the elements 1211 and 1221 is a vector, summation refers to the usual vector summation. With the element-wise summation method, the three tensors (i.e., the image tensor 1210, the context tensor 1220, and the combined tensor 1230) have the same dimensions, i.e. Wi×Hi×Ci.

Figure 6:
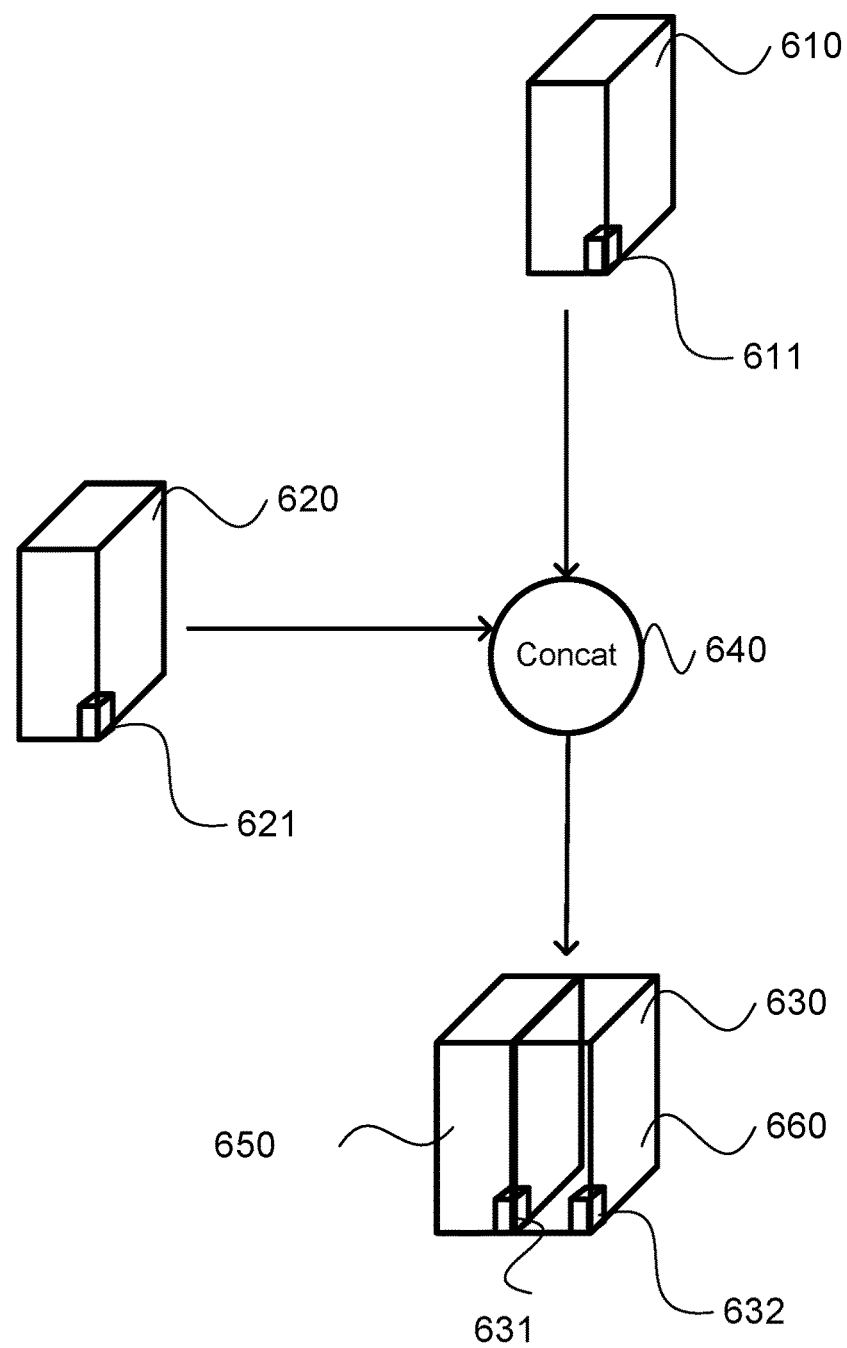
FIG. 6 illustrates the concatenation method of combining two tensors used in the sub-process shown in FIGS. 1 and 2.

In another arrangement, the image tensor and the context tensor are concatenated as illustrated in FIG. 6. The image tensor 610 and the context tensor 620 are combined into the combined tensor 630 by the concatenation operation 640. The combined tensor 630 includes two sub-blocks 650 and 660 corresponding to the image tensor 610 and the context tensor 620, respectively. Similar to FIG. 12, FIG. 6 only shows one of the elements 611 and 621 in the image tensor 610 and the context tensor 620, respectively, for simplicity sake. Therefore, after the tensors 610 and 620 are concatenated, an element 611 in the image tensor 610 has the same value as an element 631 in the sub-block 650, and an element 621 in the context tensor 620 has the same value as an element 632 in the sub-block 660. As a result, Cc=Ci+Ci. Therefore, the concatenated tensor 630 has the size of Wi×Hi×Cc. In contrast with the arrangement described in FIG. 12, the arrangement shown in FIG. 6 does not require the context tensor and the image tensor to have the same size.

Once the image tensor and the context tensor are combined, sub-process 330 proceeds from step 130 to step 135.

In step 135, sub-process 330 filters the combined tensor (e.g., 1230, 630) to output a filtered tensor of the size Cf×Wi×Hi. This step generates an image tensor that is conditioned by the context information 102. The filter could involve one or more convolution operations. In one arrangement, the filter is a series of operations of: {conv1×1, conv1×1}. Cf is dependent on the combination operation performed in step 135.

In another arrangement, the series of operations performed in step 135 could be performed in either step 130 or step 140.

Sub-process 330 proceeds from step 135 to step 140 once the combined tensor (e.g., 1230, 630) has been filtered.

In step 140, sub-process 330 processes the filtered tensor to output a 1×W×H tensor, which represents an attribute (in this example, a foreground mask 150) of the object in the image 101. Step 140 is a recognition step in order to determine the attribute (in this example, the foreground mask 150). The recognition could involve a plurality of convolution operations, deconvolution operations, pooling operations, and fully connected operations. For example, the recognition step could be a series of operations as follows: {deconv, conv3×3, deconv, conv3×3, deconv, conv3×3, conv3×3}.

In the example of FIG. 1, the attribute is a foreground mask 150 of the object (i.e., a person) in the image 101.

In another example, the attribute could be a body part of the person in the image 101. In this case, the attribute is a mask for the particular body part to be identified.

In another example, the attribute could be whether the person in the image 101 is wearing a hat or whether the person in the image 101 has an umbrella.

In another example, the attribute could be keypoint detections (such as positions of the head of the person in the image 101).

Each pixel in the foreground mask 150 would have a value in the range between 0 and 1, representing the likelihood that this pixel is a foreground (i.e., part of the person in the image 101). A threshold could then be applied to the foreground mask 150, such that any value below the threshold is deemed to be part of the background and any value above the threshold is deemed to be part of the foreground. In one example, the threshold is set at 0.5, so that any value above 0.5 is part of the foreground and any value below 0.5 is part of the background.

Sub-process 330 concludes at the conclusion of step 140.

FIG. 2 shows a flow chart diagram of an alternative method for performing sub-process 330. The method of sub-process 330 shown in FIG. 2 is based on the method of sub-process 330 shown FIG. 1, but with the addition of step 220, step 230, and step 235.

Each step (i.e., step 110, 120, 130, 135, 140) performed by sub-process 330 is implemented by a sub-network of a CNN, where a sub-network includes one or more layers of the CNN. Therefore, each of steps 110, 120, 130, 135, 140, 220, 230, and 235 can also be referred to respectively as a sub-network 110, 120, 130, 135, 140, 220, 230, and 235. In the present disclosure, the reference numerals 110, 120, 130, 135, 140, 220, 230, and 235 can refer to either the step taken or the sub-network used to perform that particular step.

Step 220 could be identical to the operation performed in step 120. Step 220 takes the context information 102 and apply a similar operation as in step 120 to form a context tensor of size Ci×Wi×Hi. However, it is possible for steps 120 and 220 to perform different operations and have different sub-network layouts in the CNN.

Step 230 is similar to step 130. The difference is that step 130 receives the image tensor and the context tensor as input, while step 230 receives the filtered tensor generated in step 135 and the context tensor from step 220 as input.

Step 235 is similar to step 135.

The alternative method shown in FIG. 2 provides an improvement to the accuracy of the foreground mask 150 due to the additional steps 220, 230, and 235. It is possible to further improve the accuracy of the mask 150 by providing further additional steps similar to steps 220, 230, and 235, with the cost of longer computational time.

Similar to FIG. 1, the mask 150 of FIG. 2 is a foreground mask of the object (i.e., a person) in the image 101.

Depending on the application scenarios, it is possible and could be an advantage to separate the processes in FIGS. 1 and 2 into multiple hardware. Although only FIG. 2 is shown to be implemented in separate hardware, the processes in FIG. 1 could be similarly separated. In one example, the processes related to context information 102, 120, 220, which is grouped by a dotted box 250, could reside in one hardware, while the rest of the processes, which is grouped by a dotted box 260, could reside in another hardware. For example, the dotted box 250 and 260 could reside in a PC and a network camera, or two separate PCs, or two separate network cameras. The context tensor generated by 120 and 220 generated by one hardware are transferred through a communication method (e.g., WAN 820) to another hardware. The communication method could be a network, or a bus, or a recording media.

One reason for such arrangements is that there are multiple cameras that share the same context, e.g. the context is the weather status. The tensors then only need to be calculated once and are shared to all cameras. Another reason is to distribute the computation load to multiple hardware.

The term "network without context" shall refer to the CNN sub-networks for the steps grouped in the dotted box 260, which may be used to determine the attribute (e.g., the foreground mask, characteristics) of an object without the context information. For the network without context, the steps 130 and 230 could replace the context tensor with an unavailability value that indicates the context is unavailable. The unavailability may be represented by a value which could be zero, or a fixed number, or a random number. One example in which the context is unavailable is when the hardware grouped by the dotted line 250 does not exist or is not functional. Another example is when the context information 102, step 120, or step 220 does not exist or is not functional.

The term "network with context" shall refer to all the steps (or sub-networks) shown in FIG. 2 and FIG. 1 (i.e., the sub-networks grouped in the dotted boxes 250 and 260), which determine the attribute (e.g., the foreground mask 150, the characteristics) of the object with the context information 102.

Training

The weights in CNN determine the accuracy of the attribute estimated by sub-process 330. The process of obtaining the weights is called training. The CNNs used in FIGS. 1 and 2 can be trained using two training methods. Method 1 trains the "network without context" (i.e., the sub-networks grouped in the dotted box 260) first, and then using the weights obtained from "network without context" as initial weights, trains the "network with context" (i.e., the sub-networks grouped in the dotted boxes 250 and 260). Method 2 trains both networks (i.e., the sub-networks grouped in the dotted boxes 250 and 260) together.

Training Method 1 (Sequential Training Method)

Figure 7:
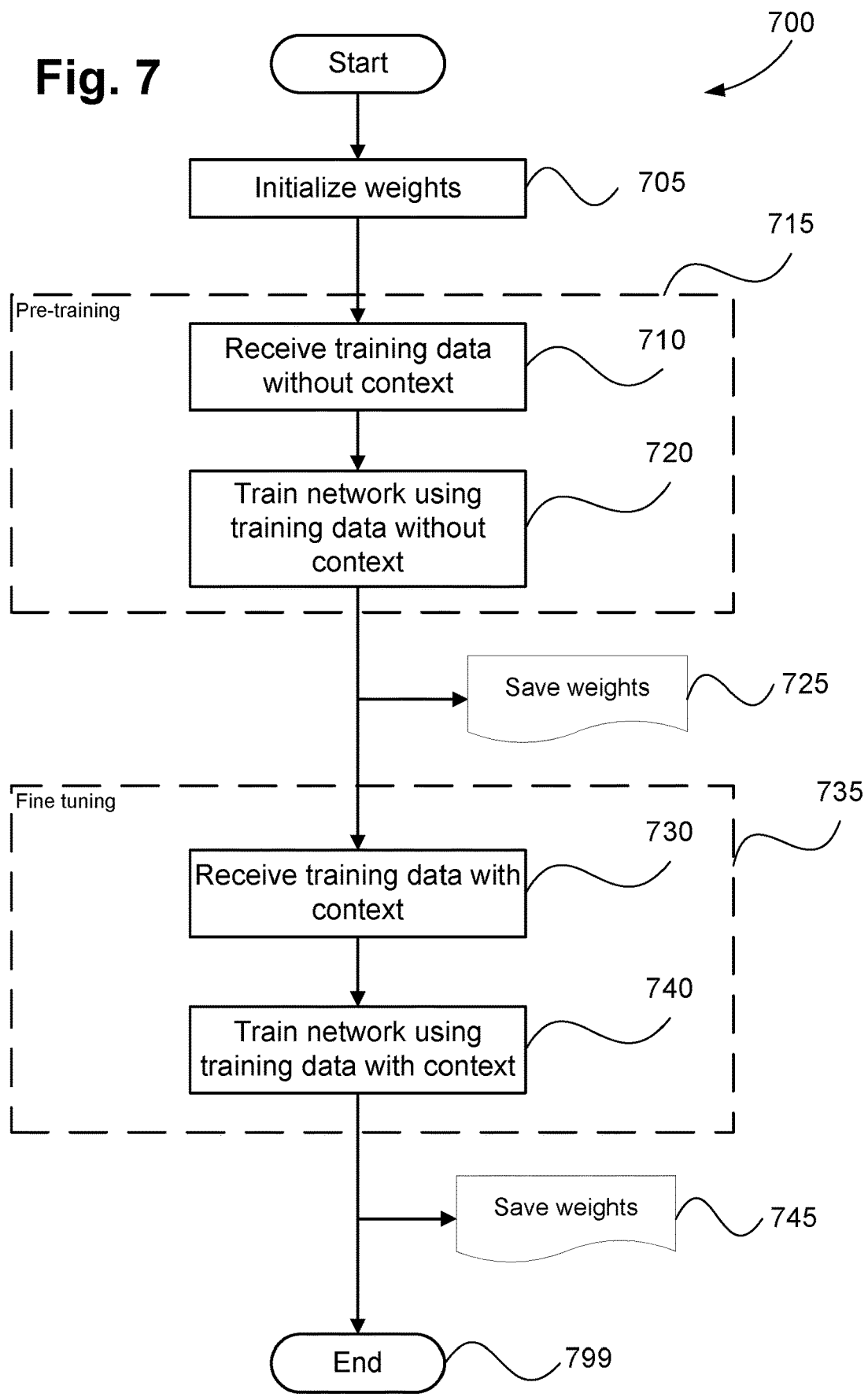
FIG. 7 is a flow chart diagram of a method of training a CNN used in the object attribute estimation method shown in FIG. 3.

FIG. 7 depicts a flow chart of the first training method 700. The method 700 commences at step 705 where the weights are initialized using a random number between 0 and 1 in both the network without context (i.e., the sub-networks in the dotted box 260) and the network with context (i.e., the sub-networks grouped in the dotted boxes 250 and 260). The method 700 then proceeds from step 705 to the pre-training steps 715.

The pre-training steps 715 includes steps 710 and 720. The goal of pre-training steps is to determine the weights of the "network without context", namely sub-networks 110, 130, 230, 135, 235, and 140 (see FIGS. 1 and 2).

In step 710, the method 700 receives the training data without the context information. The training data is a set of training input and output instances. In the example of foreground mask determination, the training input is a person image, and the training output is the correct foreground mask. The output instances are also called the "ground truth". The "ground truth" foreground mask is likely to be determined by a manual process, e.g. a human operator creates the foreground region manually. The person image could be computed by an automated process similar to step 310 of person detection. Alternatively, the person image could be selected manually by a human operator.

In another example of whether a person is wearing a hat, the training data has instance pairs of a person image and the correct output of whether the person wearing a hat.

The method 700 then proceeds from step 710 to step 720.

Step 720 determines the weights of the "network without context", namely the sub-networks specified in the dotted box 260, (i.e., sub-networks 110, 130, 135, 230, 235, and 140), using the training data obtained in step 710. These weights could be updated using the back-propagation algorithm. There are many CNN platforms available for back-propagation. One example of a platform that could be used for back-propagation is the Chainer platform.

After the pre-training steps 715, the weights obtained at step 720 are saved as weights 725. The weights 725 of the "network without context" 260 can be used to determine the foreground mask 150 without the context information 102.

The method 700 then proceeds from step 720 to fine tuning steps 735.

The fine turning steps 735 includes steps 730 and 740. The fine tuning steps 735 refine the attribute (e.g., a foreground mask, a characteristic) estimation accuracy based on the context information. The goal of fine tuning steps is to determine the weights of "network with context", i.e. all the sub-networks shown in FIG. 2.

Step 730 receives the training data with the context information. The training data is a set of training input and output instances, which has an identical format to those used in step 710, except that, in addition, the training input also has the context information. The context information could be collected by an automated process similar to step 320. Alternatively, the context information could be collected by a manual process.

The sub-process 330 then proceeds from step 730 to step 740.

Step 740 determines the weights of all the sub-networks in FIG. 2. These weights could be updated using the back-propagation algorithm. Again, there are many CNN platforms available. In one example, the Chainer platform could be used to perform the back-propagation.

The weights determined at step 740 are saved as weights 745, which could be used in the "network with context".

The method 700 concludes at the conclusion of step 740.

One advantage of training method 1 is that less training samples with context are required. Generally, collecting the training samples without context is easier than collecting the training samples with context. For example, one could collect a large number of images from the Internet, but the context information of the images is usually not available. The first training method therefore reduces the total cost of the data preparation.

Another advantage of the first training method is that the training time and computation cost to train different networks of different context is less. Once a set of pre-trained weights 725 is obtained, the weights 725 could be used to carry out the fine tuning steps 735 of many networks in many different context.

Training Method 2 (Parallel Training Method)

Figure 9:
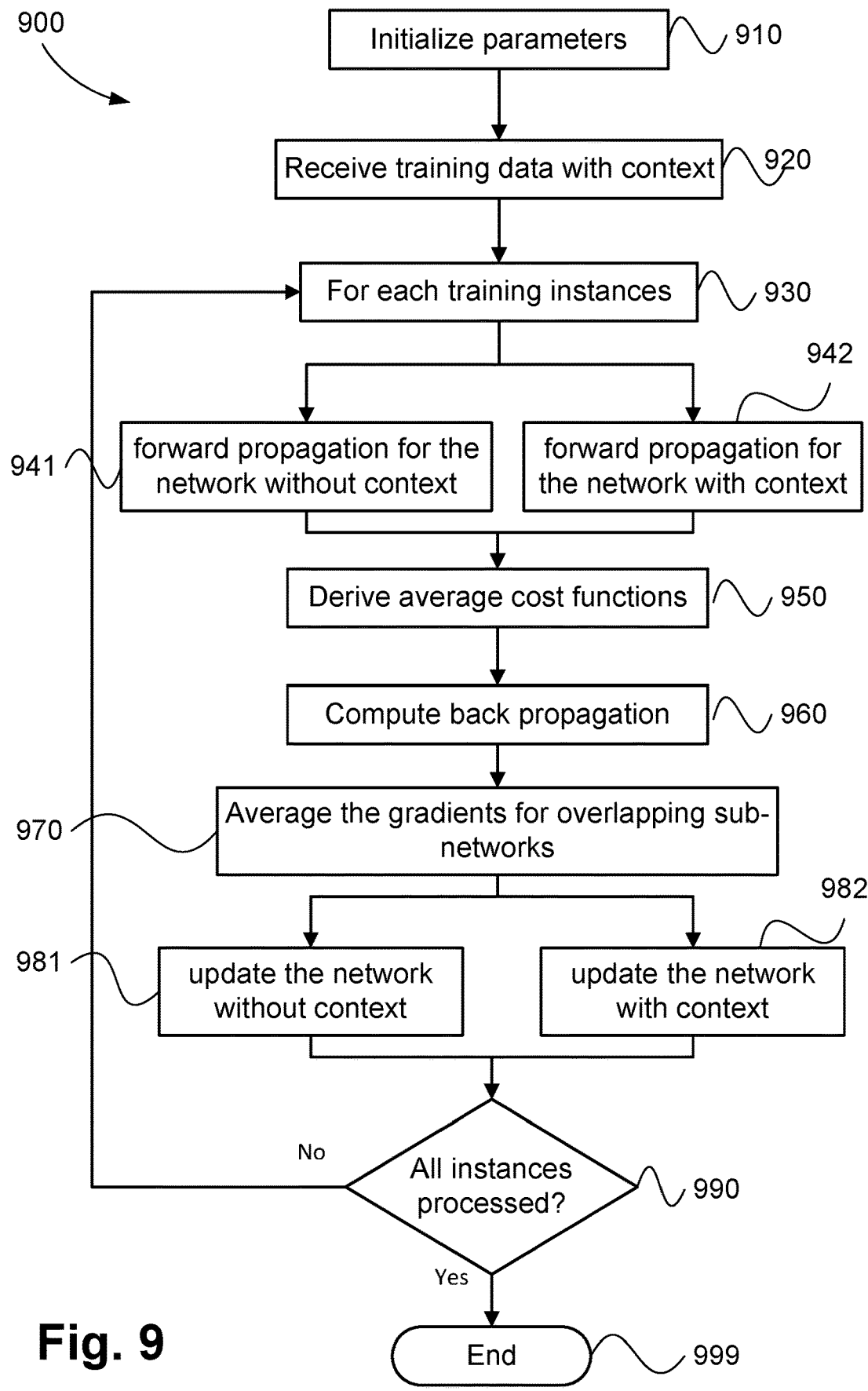
FIG. 9 is a flow chart diagram of an alternative method of training a CNN used in the object attribute estimation method shown in FIG. 3.
Figure 10:
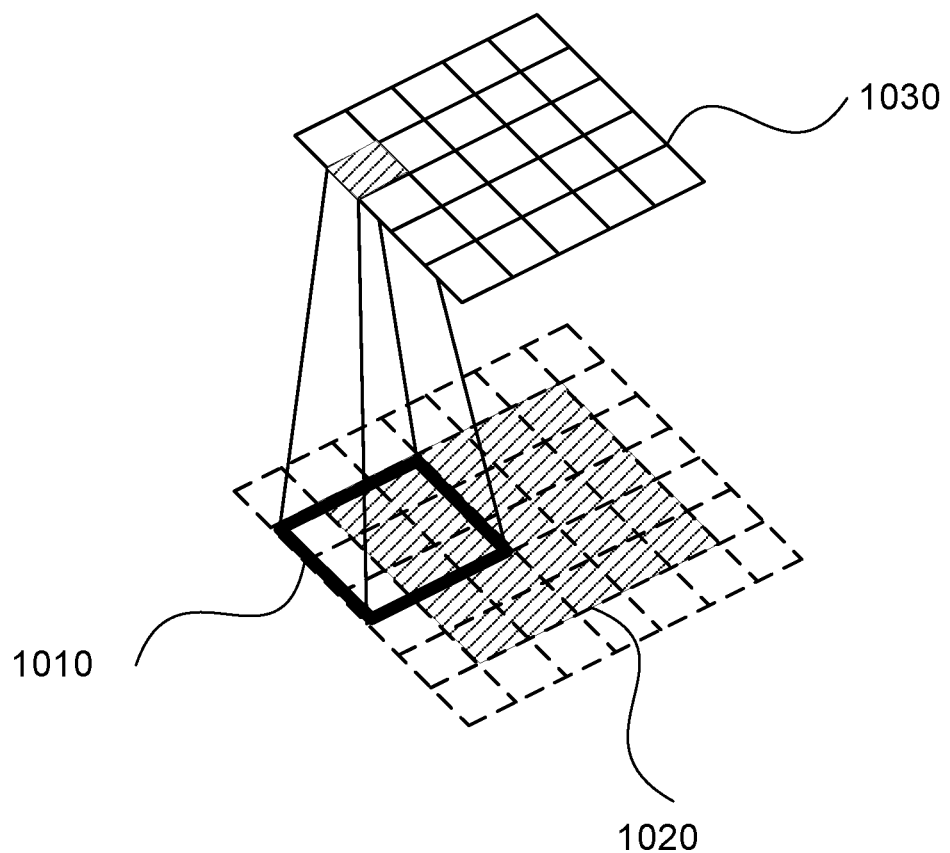
FIG. 10 illustrates the convolution operation in a CNN.
Figure 11:
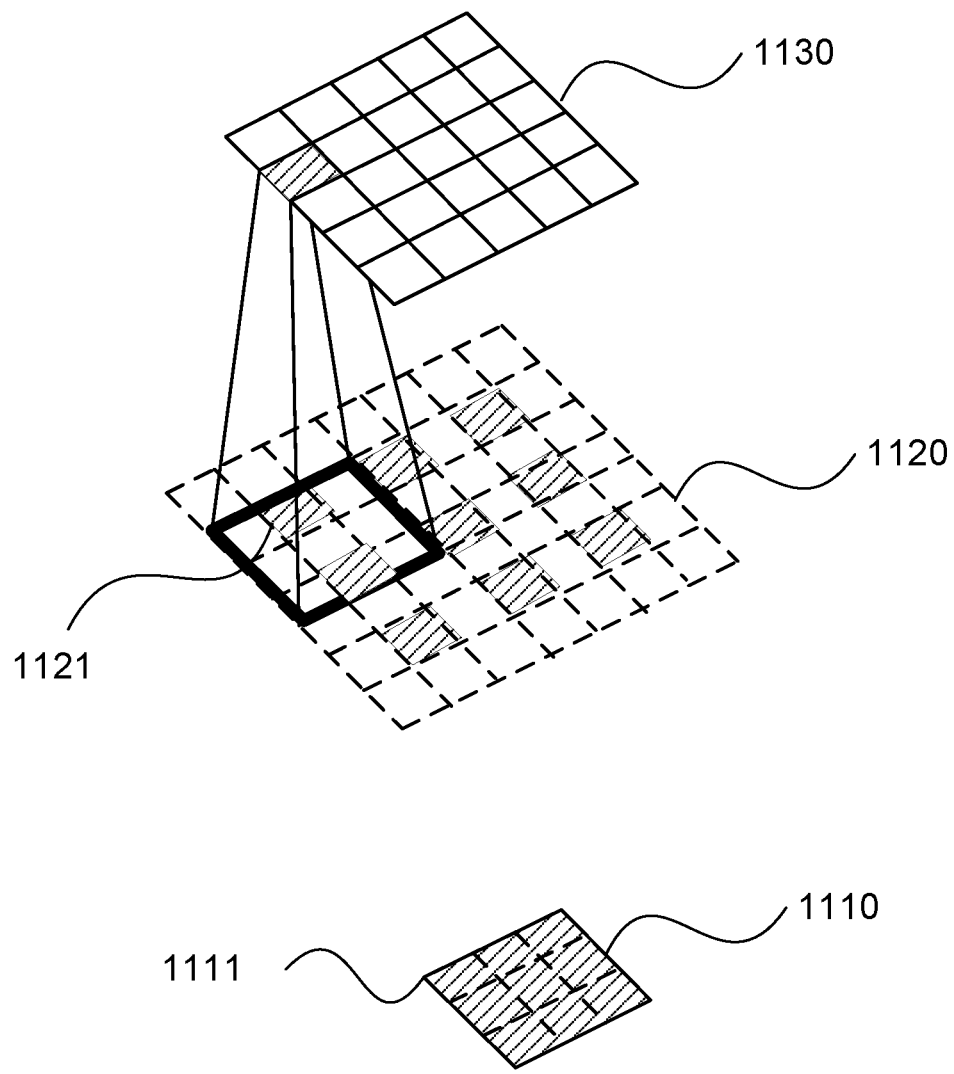
FIG. 11 illustrates the deconvolution operation in a CNN.

FIG. 9 depicts a flow chart of the second training method. The second training method trains both network, namely "network without context" and "network with context".

The method 900 commences at step 910 where the weights are initialized to a random number between 0 and 1 in both the network without context (i.e., the sub-networks in the dotted box 260) and the network with context (i.e., the sub-networks grouped in the dotted boxes 250 and 260). The weights of the network without context and the network with context are initialized so that the common part of the networks (i.e., the sub-networks in the dotted box 260) has the same weight values. The method 900 then proceeds from step 910 to step 920.

Step 920 receives the training data with context, which is the same data as described in steps 730, which has pairs of input data and output instances. The method 900 proceeds from step 920 to step 930.

For each training instance 930 in the training dataset, a forward propagation algorithm 941 is applied to the "network without context", and a forward propagation algorithm 942 is applied to the "network with context". Two cost functions are obtained respectively from the algorithms 941 and 942. The Chainer platform could be used to perform the forward propagation. The method 900 then proceeds from the algorithms 941 and 942 to step 950.

Step 950 calculates the average of the two cost functions calculated by the algorithms 941 and 942. The method 900 then proceeds from step 950 to step 960.

Step 960 performs back propagation separately to each of the "network without context" and "network with context" using the same average value obtained in step 950. Each of the back propagation algorithm outputs gradient values for each weights in each of the networks.

So far the steps and algorithms 941, 942, 950, and 960 assume that the two networks are not related. But in fact, many of the sub-networks of the two networks refer to the same processes, namely steps 110, 130, 135, 230, 235 and 140. These sub-networks are referred to as overlapping sub-networks. The idea of this training method is that the weights in the overlapping sub-networks should be identical over the two networks. Hence, the updating gradient values should be the same for these sub-networks in both networks. Updating two sub-networks with the constraint that the weights should be identical is known as a "weight sharing" technique.

The method 900 proceeds from step 960 to step 970.

Step 970 replaces the weights of the overlapping sub-networks of each of the network, with the average weights of the overlapping sub-networks of each of the network. More specifically, let the first weights in sub-network 140 which is part of the "network without context", has a gradient value of v1. Let the first weights in sub-network 140 which is part of the "network with context", has a gradient value of v2. Even though it is referring to the same weight in the same sub-network, the gradient value is different in the two networks because they are obtained from two separate forward propagations, in which one has context information and one does not. Let v3=(v1+v2)/2. In step 970, the gradient value of v1 of the first weights in sub-network 140 in "network without context" is replaced with v3. Similarly, the gradient value of v2 of the first weights in sub-network 140 in "network with context" is also replaced with v3. In step 970, this averaging process is applied to each of the weights in the overlapping sub-networks.

The method 900 proceeds from step 970 to steps 981 and 982.

Step 981 and step 982 use the gradient values to update the weights in "network without context" and "network with context" separately. This is a standard process in many CNN platforms. The method 900 then proceeds from steps 981 and 982 to step 990.

Step 990 determines whether all instances in the training data have been processed. If NO, the method 900 proceeds from step 990 to step 930 to carry on the training with the next training instance. Therefore, the method 900 continues until all training instances are used to train the two networks. If YES, the method 900 concludes.

One advantage of training method 2 is that even though it is training for two networks, but the weights of each of the overlapping sub-networks are the same. In other words, the "network with context" could perform the function of both "with context" and "without context". This enables the unavailability value to operate the same way as a usual context tensor.

In runtime, if the context is not available, the foreground mask 150 could be determined using the "network with context", and set the context information to zero. This means only the "network with context" is needed to be stored for use. On the other hand, if the training method 1 as described in FIG. 7 is used, both the network without context and the network with context would need to be stored for use as the network to be used would be dependent on whether the context information is available. The parallel training method (i.e., training method 2) could reduce memory space used in hardware.

Unavailability of Context

The "network with context" trained using training method 2, has the capability to compute the output (in this example, the foreground mask 150) even if the context information 102 is not available. This is because the context tensor, which is the input to the sub-networks of 130 and 230, of "network with context", could have the unavailability values already stored. Hence, using the unavailability values would make the "network with context" equivalent to the "network without context".

In one scenario, the processes in the networks grouped in the dotted boxes 260 and 250 could be processed on different hardware, but due to temporally malfunctioned communication or hardware, the processes in networks grouped in the dotted box 260 could not obtain the context tensors from the networks grouped in the dotted box 250. In such a case, the sub-networks in the dotted box 260 could work correctly without context information from the sub-networks grouped in the dotted box 250. When the context information is available again, the sub-networks grouped in the dotted box 260 could improve accuracy by using context information again.

Use Case Example (Body Part Segmentation)

The method 300 could be used to segment body parts. Body part segmentation refers to an application that, given a person image 101, outputs a vector for each pixel. The vector includes values, where each value indicates the likelihood of a body part being shown by that pixel as belonging to a certain body part. For example, the vector has values of <0, 1, 0, 0, 0, 0, 0, 0> identifying the likelihood that the pixel corresponding to the vector belongs to one of the 8 body parts of background, hair, face, torso, left arm, right arm, left leg, and right leg. The body part segmentation fulfils the goal of the foreground mask application, because the first value of the 8 tuple vector is essentially the background mask.

Referring to FIG. 2, the sub-networks for body part segmentation are similar to the foreground mask sub-networks. The only difference is the subnetwork 140 which now outputs a tensor of W×H×Cb, where W and H is the width and height of the person image, where Cb is the number of classifications of each pixel, which is Cb=8 in this example. The context of deviated angle, shown in FIG. 4, could also aid body part segmentation. The training algorithm depicted in FIG. 7 or FIG. 9 could also be used to train the CNN for this example.

Use Case Example (Characteristic Estimation)

The use of the object attribute estimation method 300 could also be applied to an object characteristic such as a set of statements related to a person. For example, the statements could be whether "The person is wearing a hat" and whether "The person has an umbrella". Characteristic estimation refers to the estimation of the likelihood of each statement being true. For example, an estimation of <0.8, 0.1> for this person characteristic, means the person is likely wearing a hat, and unlikely to have an umbrella.

Referring to FIG. 2, in the application of person characteristic, assuming there is no context information for now, the input 101 is also a person image, the output 150 is the likelihood of the two attribute statements. The sub-networks grouped in the dotted box 260 would mostly be similarly designed, except that in last sub-network 140, which needs to produce a 2×1 vector that represents the likelihood of the two attribute statements. Sub-network 140 could include a plurality of convolutional layers and fully connected layers, e.g. {conv3×3, conv3×3, fc, fc}. These sub-networks could be trained by the pre-training steps 715, which produce the appropriate weights 725 for the CNN to function well.

Now, assumed that the weather information of when the person image is taken is given. This information is the context information 102 in the object attribute estimation method 300. The context information 102 could be presented by a vector of four values, e.g. <0.3, 0.7, 0, 0>, which could represent the portion of the day that is sunny, cloudy, rainy, or snowy. Such context information is processed in the sub-networks grouped in the dotted box 250, and are combined to the sub-networks grouped in the dotted box 260. Through the fine tuning training steps 735, or through the parallel training in FIG. 9, the appropriate weights for the entire foreground mask segmentation method CNN could be obtained. The characteristic estimation is now more accurate because the weather context could contribute to the likelihood estimation of wearing hats or having an umbrella.

Use Case Example (Characteristic Estimation—Keypoint Detection)

The use of the object attribute estimation method 300 could also be applied to the detection of object characteristics such as keypoints. The object key point refers to a particular point related to an object. For example, positions of head and foot could be the keypoints of a person.

The network and the training method of this use case is very similar to the use case example of person attribute estimation. The output 150 of this use case is a vector including the coordinates of the keypoints. The context information 102 could be the deviated angle as shown in FIG. 4, and the last sub-network 140 needs to produce a vector, similar to the person attribute example.

Assuming that the upper body of the person is visible and the lower body is occluded by another person, the position of the foot could be estimated from the shape of the upper body and the deviated angle information of the person. Therefore, the context information could compensate for the occlusion and any other image noise.

Each step or sub-process in the method 300 or any other methods described hereinbefore is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The object attribute estimation method 300 may alternatively be implemented in dedicated hardware such as one or more integrated circuits performing the functions or sub functions of the method 300. Such dedicated hardware may include graphic processors, digital signal processors, or one or more microprocessors and associated memories, and may reside on platforms such as video cameras.

The invention claimed is:

1. A method of analysing an object in an image, the method comprising the steps of:
   determining an image tensor of the image;
   determining context information of the image;
   determining a context tensor of the determined context information;
   combining the image tensor and the context tensor to form a combined tensor;
   estimating an attribute of the object based on the combined tensor; and
   applying a filter sub-network to filter the combined tensor to form a filtered tensor.

2. The method of claim 1, wherein the steps are performed by a convolutional neural network.

3. The method of claim 2, wherein the attribute is any one of: a foreground mask and a characteristic.

4. The method of claim 3, wherein the step of estimating the attribute of the object outputs a two-dimensional matrix or a vector.

5. The method of claim 2, wherein the context information is any one of: a deviated angle of the object, weather information, camera settings, a time of a day, and environment information.

6. The method of claim 2, wherein the convolutional neural network is trained by a sequential training method or a parallel training method.

7. The method of claim 2, wherein the step of the determining of the context tensor comprises reshaping a one-dimensional vector to a tensor.

8. The method of claim 2, wherein the combined tensor is formed based on a summation of the image and context tensors or a concatenation of the image and context tensors.

9. The method of claim 2, wherein the context information includes unavailability values to replace the context tensor.

10. A system of analysing an object in an image, the system comprising;
    a processor;
    a memory in communication with the processor, the memory having application programs that are executable by the processor, wherein the processor executes the application programs to perform a method of analysing the object in the image, the method comprising the steps of:
    determining an image tensor of the image;
    determining context information of the image;
    determining a context tensor of the determined context information;
    combining the image tensor and the context tensor to form a combined tensor;
    estimating an attribute of the object based on the combined tensor; and
    applying a filter sub-network to filter the combined tensor to form a filtered tensor.

11. The system of claim 10, wherein the steps are performed by a convolutional neural network, the convolutional neural network is one of the application programs stored in the memory.

12. The system of claim 11, wherein the attribute is any one of: a foreground mask and a characteristic.

13. The system of claim 12, wherein the step of estimating the attribute of the object outputs a two-dimensional matrix or a vector.

14. The system of claim 11, wherein the context information is any one of: a deviated angle of the object, weather information, camera settings, a time of a day, and environment information.

15. The system of claim 11, wherein the convolutional neural network is trained by a sequential training method or a parallel training method.

16. The system of claim 11, wherein the step of the determining of the context tensor comprises reshaping a one-dimensional vector to a tensor.

17. The system of claim 11, wherein the combined tensor is formed based on a summation of the image and context tensors or a concatenation of the image and context tensors.

18. The system of claim 11, wherein the context information includes unavailability values to replace the context tensor.

* * * * *